United States Patent
Thies

(10) Patent No.: US 8,648,128 B2
(45) Date of Patent: *Feb. 11, 2014

(54) WRITING SUBSTANCE FOR WRITING, DRAWING AND/OR PAINTING TOOLS

(75) Inventor: Andreas Thies, Effeltrich (DE)

(73) Assignee: J.S. Staedtler GmbH & Co. KG, Nürnberg (DE)

( * ) Notice: Subject to any disclaimer, the term of this patent is extended or adjusted under 35 U.S.C. 154(b) by 71 days.

This patent is subject to a terminal disclaimer.

(21) Appl. No.: 13/384,677

(22) PCT Filed: Jul. 8, 2010

(86) PCT No.: PCT/EP2010/004160
§ 371 (c)(1),
(2), (4) Date: Jan. 18, 2012

(87) PCT Pub. No.: WO2011/009535
PCT Pub. Date: Jan. 27, 2011

(65) Prior Publication Data
US 2012/0322927 A1 Dec. 20, 2012

(30) Foreign Application Priority Data
Jul. 18, 2009 (DE) .......................... 10 2009 033 830

(51) Int. Cl.
*C09D 13/00* (2006.01)

(52) U.S. Cl.
USPC .......................................................... 523/164

(58) Field of Classification Search
None
See application file for complete search history.

(56) References Cited

U.S. PATENT DOCUMENTS

| 2002/0139278 | A1 | 10/2002 | Hashimoto |
| 2006/0020055 | A1* | 1/2006 | Krasnikov et al. ............ 523/164 |
| 2011/0118383 | A1 | 5/2011 | Thies |
| 2011/0129284 | A1 | 6/2011 | Thies et al. |

FOREIGN PATENT DOCUMENTS

| DE | 3827968 | 12/1989 |
| JP | 7179806 | 7/1995 |
| WO | 2010006742 | 1/2010 |
| WO | 2010006744 | 1/2010 |

* cited by examiner

*Primary Examiner* — Vu A Nguyen
(74) *Attorney, Agent, or Firm* — Lucas & Mercanti, LLP; Klaus P. Stoffel

(57) ABSTRACT

A polymer-bound writing substance for writing, drawing and/or painting tools, particularly for pencils or colored pencils, including at least one polymer bonding agent, at least one wax, and at least one filler material, wherein the writing substance is further provided with 0.1 to 5 wt % of palm kernel oil, and/or coconut butter, and/or coconut oil, and/or oleic acid.

10 Claims, No Drawings

WRITING SUBSTANCE FOR WRITING, DRAWING AND/OR PAINTING TOOLS

The present application is a 371 of International application PCT/EP2010/004160, filed Jul. 8, 2010, which claims priority of DE 10 2009 033 830.6, filed Jul. 18, 2009, the priority of these applications is hereby claimed and these applications are incorporated herein by reference.

BACKGROUND OF THE INVENTION

The invention relates to polymer-bound writing substances for writing, drawing and/or painting tools.

Such writing substances for writing, drawing and/or painting are known in principle. "Polymer-bound graphite-based writing substances for writing, drawing and/or painting" are understood to be writing substances which are inserted rigidly into wood or other materials which can be sharpened, and also writing substances which are held displaceably in a rigid casing. Examples of this include wood-cased pencils and writing substances for mechanical pencils, for example 'retractable pencils'. In this case the writing substances normally have an outer diameter in the range of approximately 0.3 mm to 6 mm.

For example, polymer-bound graphite writing substances are known from DE 38 27 968 C1. Such raw writing substances contain a polymer bonding agent, lubricants and fillers.

A drawback in the production of such writing substances is that although the writing and painting properties thereof are very good with a high filler material content of more than 50 wt. %, the viscosity of the writing substance mass during extrusion is very high and the extrusion pressure thus required in the die and in the extruder reaches very high values. The head pressure is approximately 350 bar. This is disadvantageous since a greater dimensioning of the extruder and complex configuration are required. The service life of the equipment and dies is much reduced by the high extrusion pressure.

SUMMARY AND DESCRIPTION OF THE INVENTION

The object of the invention is therefore to provide a writing substance for writing, drawing and/or painting which does not have the aforementioned drawbacks and which can be produced at low extrusion pressure.

The object is achieved for polymer-bound writing substances for writing, drawing or painting tools, in particular for pencils or coloured pencils, comprising at least one polymer bonding agent, at least one wax, and at least one filler material, in that the writing substance further comprises 0.1 to 5 wt. % of palm kernel oil, and/or coconut butter, and/or coconut oil and/or oleic acid.

It has surprisingly been found that an inner lubricant is added to the formulation by the selective addition of palm kernel oil, and/or coconut butter, and/or coconut oil and/or oleic acid as a writing substance component, significantly reducing the extrusion pressure in the extruder. The addition of palm kernel oil, and/or coconut butter, and/or coconut oil and/or oleic acid in the writing substance composition leads in particular with extrusion to a considerable reduction in the pressing or extrusion pressure at the mouthpiece or head of the extruder. The pressure decreases with increased addition of palm kernel oil, and/or coconut oil, and/or coconut butter and/or oleic acid, wherein a reduction in pressure by at least 30%, in particular by at least 50% compared to conventional extrudable writing substance compositions is achieved.

It has been found that other natural or synthetic oils also reduce the pressure in the extruder, but that these are overproportionately detrimental to the strength of the extruded writing substance. Surprisingly, this is not the case with use of palm kernel oil, and/or coconut butter, and/or coconut oil and/or oleic acid, since the pressure in the extruder is low, yet the strength of the writing substance is provided to the required extent.

The addition of palm kernel oil, and/or coconut butter, and/or coconut oil and/or oleic acid also provides a more intense colour of the stroke of the writing substance and improves the sliding behaviour thereof when writing. In the case of pencil writing substances, a deep stroke of high density is demonstrated, whilst coloured pencil writing substances exhibit a deep, bright intense shade of the stroke.

The proportion of palm kernel oil, and/or coconut butter, and/or coconut oil and/or oleic acid in the writing substance composition lies in the range of 0.1 to 5 wt. %, in particular in the range of 0.5 to 2.5 wt. %. If the content of palm kernel oil, and/or coconut butter, and/or coconut oil and/or oleic acid exceeds the aforementioned limit of 5 wt. %, the strength of the writing substance will be overproportionately reduced. The writing substances then tend to crumble or break during use.

At 20° C., the waxes used are ductile, compact to brittle, have a coarse to finely crystalline structure, are translucent to opaque in terms of colour, but are not glassy and melt above 40° C. without decomposition. They are free-flowing slightly above the melting point and have a largely temperature-dependent consistency and solubility.

The writing substances according to the invention are raw writing substances which can be used immediately after extrusion without further heat treatment or impregnation.

In addition to pencil and coloured pencil writing substances, special writing substances such as writing substances for "carpenter's pencils" are also cited.

Advantageous embodiments emerge from the dependent claims.

It has proven to be advantageous if the polymer-bound writing substance comprises
  10 to 30 wt. % polymer bonding agent
  2 to 25 wt. % wax
  0.1 to 5 wt. % palm kernel oil, and/or coconut butter, and/or coconut oil and/or oleic acid
  remainder filler material(s).

In particular, it is preferable if the polymer-bound writing substance comprises
  15 to 25 wt. % bonding agent
  4 to 20 wt. % wax
  0.5 to 2.5 wt. % palm kernel oil, and/or coconut butter, and/or coconut oil and/or oleic acid
  remainder filler material(s).

It has been proven to be useful if the at least one bonding agent is formed of at least one polymer of the group comprising polystyrene (PS), styrene acrylonitrile (SAN), styrene-butadiene (SB), polyolefins (PO) and acrylonitrile butadiene styrene (ABS).

Mixtures of two or more bonding agents may also be used.

It has also proven to be useful if the at least one wax is at least one wax from the group comprising stearates, montan waxes, amide waxes and paraffins.

Mixtures of two or more waxes may also be used.

It is particularly preferable if the at least one wax is formed of calcium stearate or comprises calcium stearate.

The at least one filler material is advantageously formed of at least one filler material of the group comprising graphite, soot, hexagonal boron nitride, layered silicates, chalk, baryte, coloured pigments and uncoloured pigments.

For pencil writing substances, graphite or graphite in combination with soot as a chromophoric filler material is preferred in particular. For coloured pencil writing substances, combinations of white or colourless filler, such as hexagonal boron nitride, layered silicates, etc., with chromophoric pigments such as azo pigments, phthalocyanines, dioxazines, quinacridones, iron oxides, soot, graphites, ultramarine or iron cyano complexes have proven to be of use.

A preferred composition for a pencil writing substance comprises:
  15 to 25 wt. % bonding agent
  4 to 12 wt. % wax
  0.5 to 2 wt. % palm kernel oil, and/or coconut butter, and/or coconut oil and/or oleic acid
  remainder graphite or graphite and soot.

In particular, a pencil writing substance comprises:
  15 to 25 wt. % polystyrene (PS)
  4 to 12 wt. % calcium stearate
  0.5 to 2 wt. % palm kernel oil, and/or coconut butter, and/or coconut oil and/or oleic acid
  remainder graphite or graphite and soot.

An exemplary formulation 1 for a pencil writing substance comprises:
  polystyrene (PS) 21 wt. %
  calcium stearate 6 wt. %
  oleic acid 1.0 wt. %
  graphite remainder.

An exemplary formulation 2 for a pencil writing substance comprises:
  polystyrene (PS) 20.5 wt. %
  calcium stearate 6 wt. %
  coconut oil 1.5 wt. %
  graphite remainder.

The reduction in extrusion pressure in the extruder head during production of a pencil writing substance according to the invention in accordance with formulation 1 compared to an extruded pencil writing substance according to the prior art is illustrated in the Table below.

|  | Pencil writing substance of formulations 1 and 2 | Writing substances according to the prior art |
| --- | --- | --- |
| Pressure in the extruder head (in bar) | <200 | 350-450 |

It can clearly be seen that writing substances which are formed in accordance with the inventive composition require much lower extrusion pressures for production. Equipment and die service life is extended and equipment design is simplified.

An exemplary formulation 3 for a pencil writing substance comprises:
  styrene-acrylonitrile (SAN) 15 wt. %
  aluminium stearate 10 wt. %
  coconut oil 2 wt. %
  graphite remainder.

An exemplary formulation 4 for a pencil writing substance contains:
  polystyrene (PS) 15 wt. %
  aluminium stearate 10 wt. %
  coconut oil 1 wt. %
  palm kernel oil 1 wt. %
  graphite remainder.

A preferred composition for a coloured pencil writing substance comprises:
  15 to 25 wt. % bonding agent
  4 to 12 wt. % wax
  0.5 to 2 wt. % palm kernel oil, and/or coconut butter, and/or coconut oil and/or oleic acid
  remainder layered silicate(s) and/or hexagonal boron nitride as well as at least one coloured pigment and/or an uncoloured pigment.

In particular, a coloured pencil writing substance comprises:
  15 to 25 wt. % polystyrene (PS)
  4 to 12 wt. % montan wax
  0.5 to 2 wt. % palm kernel oil, and/or coconut butter, and/or coconut oil and/or oleic acid
  remainder talc and/or hexagonal boron nitride as well as at least one coloured pigment and/or an uncoloured pigment.

Extrusion has proven to be a useful method for producing a polymer-bound writing substance according to the invention.

The writing substance according to the invention is produced in particular by carrying out the steps detailed below:
  mixing and granulating all formulation components of the writing substance to form a writing substance granulate;
  extruding the writing substance granulate at a temperature in the range of 130 to 200° C. on an extruder by a suitable mouthpiece to form endless writing substance strands.
  cooling and hardening the endless writing substance strand; and
  cutting the endless writing substance strand to final lengths, in particular to the required pencil length;

Depending on the extrusion head, the cross-section of the writing substance may adopt any shape—round, square or combinations thereof. Furthermore, it is possible using multiple coextrusion to combine different writing substance formulations in one extrusion head to form a multi-component writing substance.

The invention claimed is:

1. A polymer-bound writing substance for writing, drawing or painting tools, comprising: at least one polymeric binder; at least one wax; at least one filler material; and palm kernel oil and/or coconut butter, and/or coconut oil, wherein the writing substance comprises
  15 to 25 wt. % polymeric binder
  4 to 20 wt. % wax
  0.5 to 2.5 wt. % palm kernel oil, and/or coconut butter, and/or coconut oil
  remainder filler material(s).

2. The polymer-bound writing substance according to claim 1, wherein the at least one polymeric binder is formed of at least one polymer of the group consisting of polystyrene (PS), styrene acrylonitrile (SAN), styrene-butadiene (SB), polyolefins (PO) and acrylonitrile butadiene styrene (ABS).

3. The polymer-bound writing substance according to claim 1, wherein the at least one wax is formed of at least one wax of the group consisting of fatty acids, stearates, montan waxes, amide waxes and paraffins.

4. The polymer-bound writing substance according to claim 3, wherein the at least one wax is formed of calcium stearate or comprises calcium stearate.

5. The polymer-bound writing substance according to claim 1, wherein the at least one filler material comprises at least one filler material from the group consisting of graphite, soot, hexagonal boron nitride, layered silicates, chalk, baryte, coloured pigments and uncoloured pigments.

6. The polymer-bound writing substance according to claim 1, wherein the writing substance is a pencil writing substance and comprises 15 to 25 wt. % polymeric binder
4 to 12 wt. % wax
0.5 to 2 wt. % palm kernel oil, and/or coconut butter, and/or coconut oil
remainder graphite or graphite and soot.

7. The polymer-bound writing substance according to claim 6, wherein the writing substance is a pencil writing substance and comprises 15 to 25 wt. % polystyrene
4 to 12 wt. % calcium stearate
0.5 to 2 wt. % palm kernel oil, and/or coconut butter, and/or coconut oil
remainder graphite or graphite and soot.

8. The polymer-bound writing substance according to claim 1, wherein the writing substance is a coloured pencil writing substance and comprises 15 to 25 wt. % polymeric binder
4 to 12 wt. % wax
0.5 to 2 wt. % palm kernel oil, and/or coconut butter, and/or coconut oil
remainder layered silicate(s) and/or hexagonal boron nitride as well as at least one coloured pigment and/or an uncoloured pigment.

9. The polymer-bound writing substance according to claim 8, wherein the writing substance is a coloured pencil writing substance and comprises 15 to 25 wt. % polystyrene
4 to 12 wt. % montan wax
0.5 to 2 wt. % palm kernel oil, and/or coconut butter, and/or coconut oil
remainder talc and/or hexagonal boron nitride as well as at least one coloured pigment and/or an uncoloured pigment.

10. A method for producing a polymer-bound writing substance according to claim 1, comprising the steps of forming the writing substance by extrusion.

\* \* \* \* \*